३,105,146
DEVICE FOR SELECTIVELY DETECTING THE OCCURRENCE OF FISSION PRODUCTS IN GASES
Jean Goupil, Fontenay-aux-Roses, and André Roguin, Antony, France, assignors to Commissariat a l'Energie Atomique, Paris, France, a French State Administration
Filed Dec. 2, 1958, Ser. No. 777,702
Claims priority, application France Dec. 5, 1957
6 Claims. (Cl. 250—43.5)

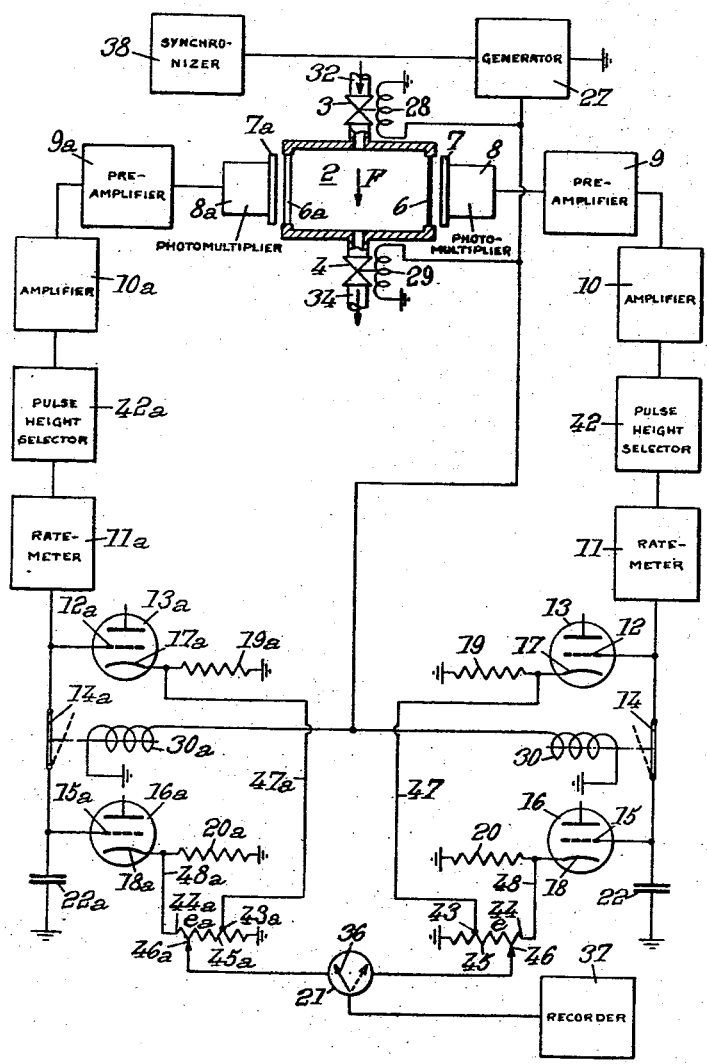

The invention concerns the selective detection of fission products in gases and more specifically in the effluents of nuclear reactors cooled by gases (as air, carbon dioxide or helium) and of the particle accelerators.

It is well known that the detection or measure of fission products in the cooling gas of a gas-cooled nuclear reactor, particularly of fission products immediately after they enter said cooling gas, is very useful for monitoring the correct working of such a reactor; it is possible, by this method, to detect very quickly an incorrect working of the reactor, and more specifically a burst in the jackets or cans surrounding the bodies of fissile and/or fertile material forming the nuclear fuel of the reactor, such burst resulting in the projection of radioactive products in the cooling gas. If the detection of the fission products in the cooling gas is prompt, it is possible to take all necessary steps for ending the abnormal working of the reactor, e.g. by unloading the burst element or elements, or even by completely stopping the reactor if necessary.

Several types of devices for detecting the fission products in gases are well known, said devices including for example Geiger-Müller counters, scintillation counters or ionization chambers. These known devices have generally several drawbacks which prevent a quick and safe detection of the arrival of fission products in a gas flow due to:

Their low sensivity,

The increasing indication thereof when the cooling gas of a neutronic reactor is recycled through said reactor, Especially their poor discrimination of the useful signals from the parasitic signals, Their maintenance difficulty and their bulk.

In fact, the radioactivity, at a given moment, of a gas leaving a nuclear reactor is constituted mostly by the sum of the radioactivity of the radioactive isotopes (as nitrogen 16 and argon 41), which were formed from the stable constituent atoms of the cooling gas by neutronic bombardment thereof in the nuclear reactor, and of the fission products which entered the cooling gas.

But these fission products are of two kinds:

(a) The long-lived fission products (as xenon 133, having a half life of several days) which, when the gas is recycled through a nuclear reactor, possess a radioactivity which persists in the gas a long time after the passage of such long-lived fission products in the cooling gas, (b) the short-lived fission products (as the heavier xenons and kryptons having a half-life of a few seconds), the radio-activity of which does not subsist for a long period after their passage in the cooling gas, even if said gas it recycled.

It is easily understood that the long-lived fission products falsify the measures, due to the fact that the activity of such fission products, which arrived a long time before in the cooling gas, is added to the activity of long-lived and short-lived fission products which have just passed in said gas and which has to detected. The only radioactivity that should be detected and measured, if the passage of fission products in the gas has to be detected immediately, is the radioactivity of the short-lived fission products.

The present invention has therefore for an object to provide a device for the selective measurement of short-lived fission products in a gas flow, so as to detect very quickly the passage of fission products in said gas flow or the increase of the fission products content in said gas flow.

The invention is particularly useful for detecting fission products in the nuclear reactors, for example after the burst of a can, and in the particle accelerators, for example with a view of determining the formation of a fission product as a result from a chain reaction, e.g. the production of radon.

The invention has also for an object the selective detection of radioactive gases having different half-lives, and specifically of nitrogen 16, in order to control the operation of a nuclear reactor.

The device according to the invention is essentially based on the rapid decay of the short-lived fission products resulting from chain reactions caused by the bombardment of fertile and/or fissile matters (as uranium and/or plutonium) by neutrons, and in particular by thermic neutrons; therefore, the difference between two activity measurements, performed on a same radioactive gas mass substantially immediately after the short-lived fission products passage in said gas mass and after a period of time equal to several half-lives of said short-lived fission products and materially inferior to the half-lives of the long-lived fission products respectively, is representative of the activity of the sole short-lived fission products, the activity of the long-lived fission products having only slightly varied, means being of course provided for performing said measurements selectively on the fission products.

The device, according to the invention, for detecting fission products in a gas flow comprises, in combination, a detection chamber, duct means for circulating at least a portion of said gas flow through said detection chamber, detecting means for determining in said chamber selectively the radioactivity due to said fission products, valve means for preventing, when energized, the circulation of said gas flow through said chamber, control means for energizing said valve means, and comparison means for comparing the determination of said detecting means before and after the operation of said control means.

In order to render said detecting means selective towards the radioactivity due to said fission products, the device, according to the invention, may comprise:

Means for selecting, in the determination of said detecting means, the portion thereof corresponding to a determined energy band of the detected radiations, corresponding specifically to said fission products, the activity of the selected portion being solely measured, And/or means for measuring specifically the activity of the radioactive isotopes produced in the gas itself by neutron bombardment and for subtracting said activity from the output of said comparison means.

The aforesaid and other objects, features and advantages of the invention will be more easily and fully understood from the illustration of one embodiment of a fission products selective detection device according to the invention, it being understood that the invention is not restricted to the details of the illustrated and described embodiment, but that it is susceptible to modifications and adaptations that will readily occur to someone skilled in the art.

In the attached single FIGURE is shown schematically one illustrative embodiment of a device according to the invention, adapted e.g. for detecting burst slugs in a heterogeneous reactor comprising jacketed uranium slugs in a graphite lattice and cooled in a closed circuit by carbon dioxide.

On said figure, the gas flow—wherein the presence of fission products has to be determined and which is for example constituted by carbon dioxide having cooled a heterogeneous nuclear reactor comprising jacketed uranium slugs disposed in a graphite lattice—arrives by a pipe 32 (which may for example be a pipe picking up a fraction of the gas circulating in a not shown main duct) in a detection chamber 2 and leaves said chamber by a pipe 34, valves 3 and 4 allowing to circulate said gas flow through said chamber 2 in the direction of arrow F or to maintain during a determined period of time, a certain volume or mass of said gas flow in said chamber 2.

The walls of chamber 2 include "windows" 6 and 6a transparent to nuclear radiations and especially to beta rays, window 6 being thinner and selectively transparent to the nuclear radiations generated by the fission products and window 6a being thicker and selectively transparent to the nuclear radiations generated by the radioactive coolant isotopes. In front of the thin window 6, is disposed a scintillating element 7 of known type (e.g. a plastic scintillator, constituted for example by a solution of tetraphenyl butadiene in polystyrene, which is specially sensitive to beta rays) to which is associated in a known manner the transparent window of a photomultiplier 8, comprising essentially a photo-cathode, transforming the light scintillations (produced in scintillating element 7 by the nuclear radiations leaving chamber 2 through window 6) into electrons, and a series of dynodes multiplying by a very high factor, generally over 1 million, the number of electrons generated by said photo-cathode. The photomultiplier tube 8 feeds successively a preamplifier 9, an amplifier 10, eventually a pulse height selector 42, selecting the pulses having an amplitude comprised in a determined band, and a ratemeter 11, all these devices 7, 8, 9, 10, 42, 11 being of a well-known type generally used for detecting nuclear radiations.

The output of the ratemeter 11, which is proportional to the mean radiations counting rate during a determined period of time (eventually, when a selector 42 is included in the circuit, only for the radiations having energies comprised in an energy band corresponding to the amplitude band selected by pulse height selector 42), is applied, on the one hand directly, to the control grid 12 of a first triode 13 and, on the other hand through switch 14, to control grid 15 of a second triode 16, said grid 15 being grounded, through a capacitor 22, or other element capable of storing electrical energy. The cathodes 17 and 18 of the triodes 13 and 16 respectively are grounded through resistors 19 and 20. The potential difference $e$ between cathodes 17 and 18 appears, the losses in leads 47 and 48 (which may have equal resistances) being neglected, between points 43 and 44 of resistor 45 disposed between cathode 18 and ground.

For reasons which will be explained hereinunder, when describing the operation of the illustrated device according to the invention, another detecting and comparison channel may be provided for improving the sensibility and the selectivity. Said second channel comprises scintillating element 7a, disposed in front of window 6a, and photomultiplier tube 8a, transforming the light scintillations of element 7a into electron bursts, said photomultiplier tube 8a feeding successively a pre-amplifier 9a, and amplifier 10a, eventually a pulse height selector 42a, and a ratemeter 11a. The measuring channel 7a, 8a, 9a, 10a, 42a, 11a is similar to channel 7, 8, 9, 10, 42, 11, but the pass band of pulse height selector 42a is generally different from the pass band of pulse height selector 42. In fact, selector 42 preferentially selects the signals corresponding to the fission products (thereby cooperating with window 6 for that purpose), e.g. the band corresponding to radiation energies inferior to about 4 mev., and selectively stops the pulses corresponding to the beta rays emitted by nitrogen 16 (which have energies superior to 4 mev.) and other radioactive isotopes produced in the gas itself by neutron bombardment which may have traversed window 6; on the contrary the pulse height selector 42a preferentially selects the signals corresponding to the beta rays emitted by the radioactive isotopes produced in the gas by neutronic bombardment, e.g. selects, for example, the signals corresponding to radiation energies above about 4 mev., and selectively stops the pulses corresponding to the fission products (which have generally energies inferior to 4 mev.) which may have traversed window 6a.

The output of ratemeter 11a is applied to a circuitry identical to the one described for the output of ratemeter 11, and on the drawing, same references were given to the elements of this circuitry and to the elements receiving the output of ratemeter 11, except that letter $a$ was added to the references corresponding to the output of ratemeter 11a; for example the potential difference between cathodes 17a and 18a appears substantially as $e_a$ between points 43a and 44a which are respectively in the central zone and at the non-grounded extremity of a resistor 45a.

Runners 46 and 46a cooperate respectively with resistors 45 and 45a, the potentials picked up by runners 46 and 46a being compared in a differential indicating apparatus 21, as a voltmeter; furthermore, a recording apparatus 37 may be provided for recording the various successive indications of needle 36 of indicating apparatus 21.

The device according to the invention further comprises a control circuit controlling valves 3 and 4 and switches 14 and 14a. This control circuit, which may be of any type known in the art, comprises, for example, a generator 27, a synchronizer 38, controlling the operation of said generator 27, and leads for delivering the current generated by generator 27 simultaneously to relay coils 28, 29, 30 and 30a which, when energized, i.e. when generator 27 is rendered operative by synchroniser 38, operate respectively for closing valve 3, closing valve 4, opening switch 14 and opening switch 14a.

The device which has been described operates as follows.

During a first period, generator 27 is cut off by synchroniser 38: electric valves 3 and 4 are opened and therefore the gas flow, wherein the fission products arrival or content increase has to be detected, passes through detection chamber 2, as shown by arrow F, the radioactivity of the ionizing particles in this gas flow being measured as the counting rates generated by ratemeters 11 and 11a; switches 14 and 14a are closed and therefore the output of ratemeter 11 is applied simultaneously on grids 12 and 15 whereas the output of the ratemeter 11a is applied simultaneously on grids 12a and 15a; points 43 and 44 are therefore substantially at the same potential and points 43a and 44a are at the same potential.

On the contrary, during a second period, generator 27 is rendered operative by synchroniser 38; said generator feeds relay coils 28, 29, 30 and 30a, thereby closing valves 3 and 4 opening switches 14 and 14a (which take the positions shown in dotted lines). Ratemeters 11 and 11a deliver therefore only on grids 12 and 12a a signal which is representative of the counting rate of the ionizing particles emitted by the gas volume enclosed in chamber 2. After about 20 to 30 seconds the activity of the short-lived radioactive isotopes (as well of the gas itself as of the fission products) has materially decreased and is substantially equal to zero. Therefore, at the end of the second period, if this period exceeds about 10 seconds, ratemeters 11 and 11a deliver a signal which is representative of the sole long-lived radioactive products enclosed in chamber 2.

Due to the fact that the activity of the long-lived and short lived radioactive products in the gas flow is stored in capacitors 22 and 22a, the potential differences $e$ and $e_a$, (which are substantially proportional to the difference between the potential of grid 15 and the potential of grid 12 on the one hand and to the difference between the potential on grid 15a and the potential on grid 12a on the other hand) are representative of the sole activity of the short-lived radioactive products in the gas flow traversing chamber 2, $e$ being essentially due to the short-lived fission products and $e_a$ to the short-lived radioactive isotopes produced in the gas itself.

As the selection between the long-lived or short-lived fission products and the long lived or short lived isotopes, which are produced in the gas itself by neutron bombardment thereof, may not be perfectly realized by window 6 and scintillating element 7, the selection may be improved by pulse height selector 42, on the one hand, and the corrective channel on the left portion of the figure, on the other hand.

Pulse height selector 42 has for an object to discard substantially all pulses generated by photomultiplier 8 and amplified in units 9 and 10 in response to scintillations produced in scintillating element 7 by ionizing radiations emitted by the isotopes of the gas itself, the ratemeter 11 controlling then only the radiations emitted by the fission products as well during the first period (long-lived and short-lived fission products) as during the second period (only long-lived fission products). Therefore, as stated hereinabove, the pulse height selector 42 discards e.g. the pulses having an amplitude corresponding to radiations having an energy level superior to about 4 mev.

In fact, window 6, scintillating element 7 and pulse height selector 42 cooperate for the selective determination of the activity of the sole fission products; the potential difference $e$ being therefore substantially equal to the sole activity of the short-lived fission products of the gas flow arriving by duct 32.

As the selectivity of the channel shown on the right portion of the figure may not be perfect and as the activity of the short-lived nitrogen 16 (having a half-life of about 7.3 seconds) may be included in the output of the ratemeter 11, the left hand channel may be provided for selectively determining the activity due to said nitrogen 16 in the gas flow arriving through duct 32.

For the same reasons as those given hereinabove for the right hand channel, the pulses difference $e_a$ is representative of the sole short-lived radioactivity in chamber 2; furthermore, if the window 6a, the scintillating element 7a and the pass band of the pulse height selector 42 are conveniently chosen, said potential difference $e_a$ is essentially representative of the activity due to short-lived isotopes resulting from the neutron bombardment of the non-radioactive atoms present in the cooling gas (especially nitrogen 16). It is therefore possible to substract from potential difference $e$ the value corresponding to the nitrogen 16 activity. Such difference is made in differential indicating apparatus 21 and recorded by recorder 37.

Therefore the device according to the invention operates as follows. Neglecting first the left hand corrective channel, the synchronizer or clock 38 renders alternatively non-operative and operative generator 27. During a first period of about 20–30 seconds the gas circulates through chamber 2 and homogeneous conditions are realized therein. Ratemeter 11 charges capacitor 22 to a potential which is mainly representative of the activity of both long-lived and short-lived fission products. During a second period also of about 20–30 seconds the mass of gas is maintained in chamber 2. Ratemeter 11 delivers on grid 12 a potential which is mainly representative of the activity of the long-lived fission products.

A voltage substantially proportional to the difference between potential of capacitor 22 and grid 12 appears in $e$. If the window 6 and pulse height selector 42 would discard all signals corresponding to the activity of the radioactive isotopes of the gas itself, the left hand channel were useless and apparatus 21 could be disposed between points 43 and 44.

On the contrary if a high precision is requested, such a channel is provided and delivers a voltage $e_a$ representative of the short-lived radioactive isotopes (as nitrogen 16) produced in the gas itself. A calibration or gauging is performed at the beginning by using a gas flow containing radioactive isotopes and especially nitrogen 16, but no fission products; at the end of the second period of the calibration the runners 46 and 46a are set so that needle 36 shows 0 (position shown in full lines). Afterwards, when the gas containing fission products is monitored by the device according to the invention, at the end the second period needle 36 will occupy the position shown in dotted lines and indicate, if apparatus 21 is conveniently calibrated, directly the fission products content of said gas.

The indication of apparatus 21 and/or recorder 37 may realize any desired control or warning operations according to the fission products content of the gas which is monitored.

It appears therefore that a device according to the invention detects quickly and safely the activity variations in a gas flow due to fission products without any moving part, whereas the prior art gas monitoring systems, e.g. the Calder Hall gas sampling system (described in the November 1956 issue of the British monthly review "Nuclear Power" pages 287–289) comprises a motor driven precipitator wire, the operation of which may fail from time to time, without including a true parasitic signals balancing device corresponding to the balancing device, comprising triodes 13 and 13a, 16 and 16a in the embodiment of the invention.

Although this invention has been described with reference to a schematic embodiment thereof, it is to be distinctly understood that various modifications and adaptations of the arrangement herein disclosed, may be made as may readily occur to persons skilled in the art, without constituting a departure from the spirit or scope of the invention, as defined in the objects and in the appended claims.

For example the radioactivity detecting means (detector and associated electronic circuit), the balancing means and the control means could be modified as will readily occur to someone skilled in the art without altering the scope of the invention. In particular the control means could realize the opening of normally closed valves 3, 4 and the closing of switches 14 and 14a during the first period of operation, instead of realizing the closing of valves 3 and 4 and the opening of switches 14 and 14a during the second period of operation.

What we claim is:

1. Device for determining the quantity of short-lived fission products in a gas flow containing short-lived as well as long-lived fission products comprising, in combination, a single detection chamber, duct means for circulating at least a portion of said gas flow through said detection chamber, means for determining in said chamber the radioactivity due to the fission products, storing means for storing said determined radioactivity determined, valve means for preventing, when energized, the circulation of said gas flow through said chamber, control means for energizing said valve means, and comparison means for comparing a radioactivity determination made before the operation of said control means and stored in said storing means and a radioactivity determination made after operation of said control means, respectively, thereby obtaining the radioactivity of the short-lived fission products as the difference between said two subsequent determinations of the radioactivity in said single detection chamber.

2. Device according to claim 1, wherein said storing means are constituted by a capacitor, wherein said comparison means comprise a first triode and a second triode each including one cathode grounded through a resistor, the output of said comparison means appearing between said cathodes, whereas the grids are connected together through a switch, the grid of said first triode being furthermore connected to the output of said detecting means and the grid of said second triode being connected to one armature of said capacitor having the other armature thereof grounded and wherein said control means also control the opening of said switch disposed between said grids.

3. Device according to claim 1, wherein said detecting means comprise a main detecting channel, selectively sensitive to the radioactivity due to said fission products, a correcting detecting channel, selectively sensitive to the radioactivity due to other radioactive products than said fission products, each of said channels comprising a window transparent selectively to beta rays and forming a portion of the walls determining said detection chamber, a scintillating element disposed in front of said window transforming a substantial portion of the beta rays traversing said window in light scintillations, a photomultiplier receiving a substantial portion of said light scintillations and delivering electron bursts in response thereto, pulse height selector means selectively transferring, among said electron bursts, the bursts having an amplitude comprised in a determined band, and rating means deducting from said electron bursts a signal which is a function of the number of beta rays having traversed said window per time unit during a determined period, the window corresponding to the said main detecting channel being thinner than the window corresponding to the said correcting detecting channel, and the pulse height selector means in said first channel selecting the electron bursts having an amplitude corresponding to the energy band of the beta rays emitted by said fission products, whereas the pulse height selector means in said correcting detecting channel selects electron bursts having an amplitude corresponding to the energy band of the short-lived among said other products, and means for substracting from the output of said main channel a portion of the output of said correcting channel corresponding to the activity of said other products detected by said main channel.

4. Device according to claim 3, wherein said main detecting channel and said correcting detecting channel comprise each, as comparison means, a first and a second triode each including one cathode grounded through a resistor, the output of said comparison means appearing between said cathodes, whereas the grids are connected together through a switch, the grid of said first triode being furthermore connected to the output of said detecting means and the grid of said second triode being connected to one plate of a capacitor having the other plate thereof grounded.

5. Device for detecting radioactive fission products in a gas flow comprising, in combination: a single detection chamber; duct means for circulating at least a portion of said gas flow through said detection chamber; detecting means for selectively determining the radioactivity produced in said chamber by said fission products, said detecting means comprising a window transparent selectively to beta rays and forming a portion of the walls determining said detection chamber; a scintillating element disposed in front of said window; a photomultiplier tube for transforming the scintillations produced in said scintillating element by the beta rays having traversed said window in electron bursts; and rating means for deducting from said electron bursts a signal which is function of the number of beta rays having traversed said window per time unit during a determined period; valve means for preventing, when in closed position, the circulation of said gas flow through said chamber; control means for bringing said valve means in said closed position; and comparison means for comparing the determination of said rating means before and after said valve means are brought in said closed position by said control means.

6. Device according to claim 5, wherein said detecing means further comprise, between said photomultiplier tube and said rating means, pulse height selector means for selectively transferring among said electron bursts the bursts having an amplitude corresponding to the energy band of the beta rays emitted by said fission products.

References Cited in the file of this patent
UNITED STATES PATENTS

| | | |
|---|---|---|
| 2,740,898 | Youmans | Apr. 3, 1956 |
| 2,744,199 | Juterbock et al. | May 1, 1956 |
| 2,751,505 | Anderson | June 19, 1956 |
| 2,751,506 | Black et al. | June 19, 1956 |
| 2,757,290 | Jacobs | July 31, 1956 |
| 2,760,079 | Arps | Aug. 21, 1956 |
| 2,761,976 | Obermaier | Sept. 4, 1956 |
| 2,795,703 | Berlman | June 11, 1957 |
| 2,823,179 | Snell et al. | Feb. 11, 1958 |
| 2,858,452 | Wouters | Oct. 28, 1958 |
| 2,861,452 | Morgan | Nov. 25, 1958 |
| 2,892,091 | Sawle | June 23, 1959 |
| 2,957,084 | Marr et al. | Oct. 18, 1960 |
| 2,969,307 | Fermi et al. | Jan. 24, 1961 |

OTHER REFERENCES

Muchlhause et al.: "Two Liquid Scintillation Neutron Detectors," Nucleonics, January 1953, pages 44 to 47.

Standing et al.: "A Method of Increasig the Effective Resolution of Scintillation Counters," The Review of Scientific Instruments, March 1953, pages 193 to 195.

Watts et al.: "Monitor Measures Air and Surface Contamination," Nucleonics, January 1955, pages 51 to 53.